(12) United States Patent
Krause et al.

(10) Patent No.: US 8,335,506 B2
(45) Date of Patent: Dec. 18, 2012

(54) METHOD OF UPDATING A ROAMING LIST IN A MOBILE DEVICE

(75) Inventors: Kevin R. Krause, Plymouth, MI (US); William E. Mazzara, Jr., Drayton Plains, MI (US); Tosha S. Lilac-McIntyre, Newport, MI (US)

(73) Assignee: General Motors LLC, Detroit, MI (US)

( * ) Notice: Subject to any disclaimer, the term of this patent is extended or adjusted under 35 U.S.C. 154(b) by 267 days.

(21) Appl. No.: 12/698,369

(22) Filed: Feb. 2, 2010

(65) Prior Publication Data

US 2011/0189991 A1   Aug. 4, 2011

(51) Int. Cl.
*H04W 4/00* (2009.01)

(52) U.S. Cl. .................. 455/432.1; 455/434; 455/435.1; 455/435.2; 455/436; 455/445

(58) Field of Classification Search .......... None
See application file for complete search history.

(56) References Cited

U.S. PATENT DOCUMENTS

| | | | |
|---|---|---|---|
| 5,761,618 A * | 6/1998 | Lynch et al. ........... 455/419 |
| 6,564,055 B1 | 5/2003 | Hronek |
| 6,915,126 B2 | 7/2005 | Mazzara, Jr. |
| 7,020,545 B2 | 3/2006 | Kamdar et al. |
| 7,035,630 B2 | 4/2006 | Knowles |
| 7,089,001 B2 | 8/2006 | Keung et al. |
| 7,116,989 B2 | 10/2006 | Mazzara et al. |
| 7,190,946 B2 | 3/2007 | Mazzara, Jr. et al. |
| 7,236,783 B2 | 6/2007 | Gould |
| 7,292,848 B2 | 11/2007 | Mazzara, Jr. et al. |
| 7,305,236 B2 | 12/2007 | Schwinke et al. |
| 7,333,808 B2 | 2/2008 | Elkarat et al. |
| 7,369,849 B2 | 5/2008 | Fraser et al. |
| 7,398,082 B2 | 7/2008 | Schwinke et al. |
| 7,493,111 B2 | 2/2009 | Knowles |
| 7,526,285 B2 | 4/2009 | Mazzara, Jr. |
| 7,991,381 B1 * | 8/2011 | Dunne et al. ............... 455/404.1 |
| 2003/0100334 A1 | 5/2003 | Mazzara, Jr. |
| 2005/0208934 A1 | 9/2005 | Italia et al. |
| 2006/0194582 A1 * | 8/2006 | Cooper ........................ 455/436 |
| 2007/0254639 A1 | 11/2007 | Chmielewski et al. |
| 2007/0293216 A1 | 12/2007 | Jiang |
| 2008/0305789 A1 | 12/2008 | George et al. |
| 2009/0088187 A1 | 4/2009 | Krause et al. |
| 2010/0304740 A1 * | 12/2010 | Uchida ..................... 455/432.1 |

* cited by examiner

*Primary Examiner* — Dai A Phuong
(74) *Attorney, Agent, or Firm* — Dierker & Associates, P.C.

(57) ABSTRACT

A method of updating a roaming list in a mobile device is disclosed herein. The method involves detecting an occurrence of an event via a processor at a back-end system, generating a trigger in response to the detecting of the occurrence of the event, and recognizing, by the processor, the trigger as a roaming list update trigger. The method further includes identifying the mobile device, via the processor, as requiring a roaming list update based on the recognizing of the roaming list update trigger, and transmitting, via a wireless connection, the updated roaming list from the back-end system to the identified mobile device.

15 Claims, 2 Drawing Sheets

METHOD OF UPDATING A ROAMING LIST IN A MOBILE DEVICE

TECHNICAL FIELD

The present disclosure relates generally to methods of updating a roaming list in a mobile device.

BACKGROUND

Roaming lists (such as, e.g., preferred roaming lists or the like) are often used to enable a telematics-equipped vehicle to connect with an appropriate mobile network in predefined geographic areas. Typically, the roaming list(s) is/are downloaded to the telematics unit when the telematics unit is activated, and such list(s) generally remain unchanged until updates are available and downloaded. Currently, the updating of the roaming list(s) may be accomplished by downloading, to each and every vehicle having an activated telematics unit, updated roaming list(s) as such updated list(s) become available.

SUMMARY

A method of updating a roaming list in a mobile device includes: detecting an occurrence of an event via a processor at a back-end system in selective and operative communication with the mobile device; generating, by the processor, a trigger in response to the detecting of the occurrence of the event; recognizing, by the processor at the back-end system, the trigger as a roaming list update trigger; identifying, by the processor at the back-end system, the mobile device as requiring a roaming list update based on the recognizing of the roaming list update trigger; and transmitting, via a wireless connection, an updated roaming list from the back-end system to the identified mobile device.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
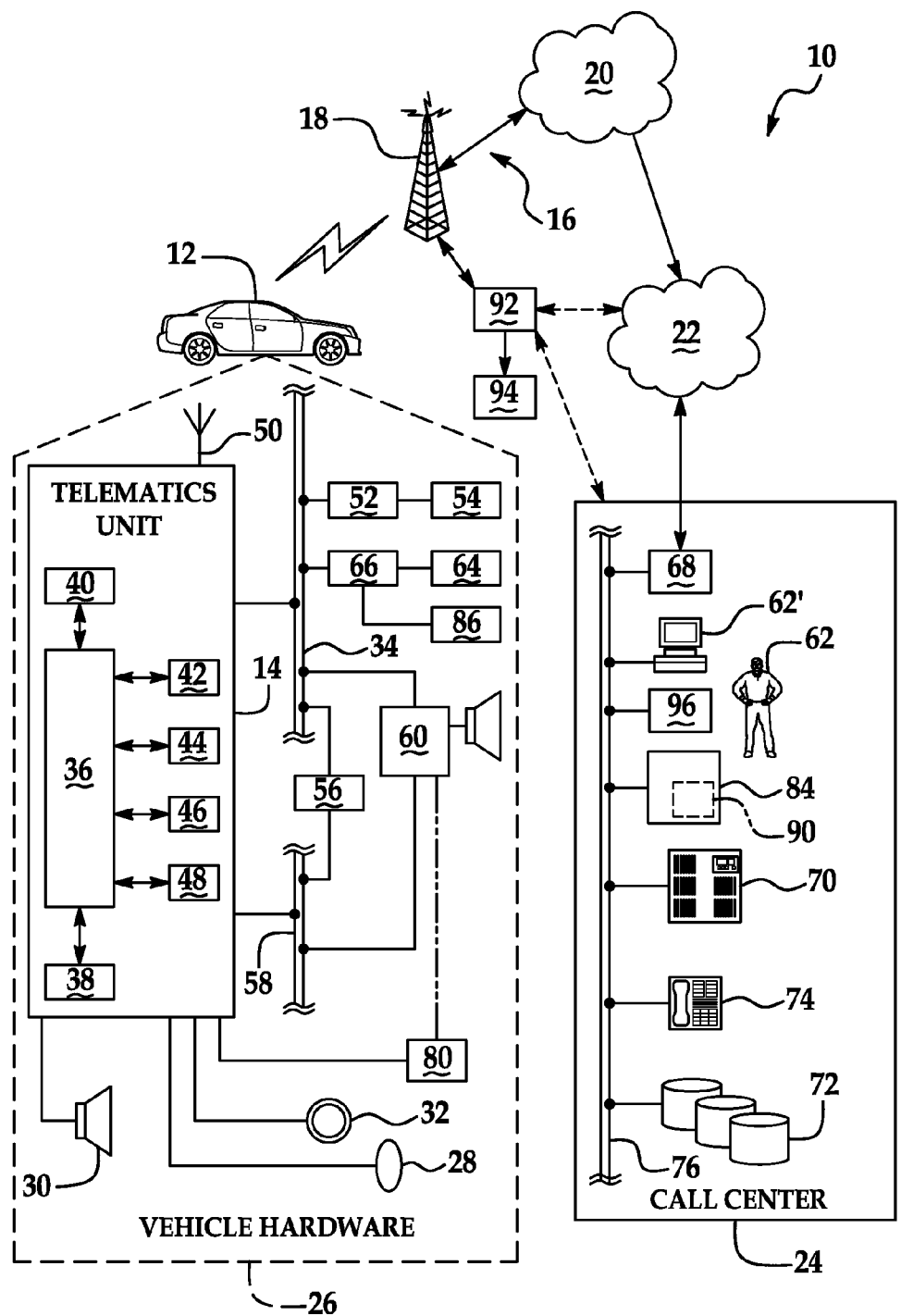
FIG. 1 is a schematic diagram depicting an example of a system for updating a roaming list in a mobile device.

Example(s) of the method disclosed herein may be used to update one or more roaming lists stored in a mobile device when an update is needed. The updating method of the instant disclosure is accomplished by targeting one or more particular mobile devices that actually need a roaming list update and then updating the list in those particular devices. This targeting approach is substantially more efficient with respect to time and cost as compared to other processes such as, e.g., those that include updating the list in every mobile device each time a new roaming list becomes available. Furthermore, the targeting approach disclosed herein is a proactive and, in some instances, predictive way of updating the roaming lists. In many cases, the roaming lists may be updated before a user or subscriber experiences a problem from having an outdated roaming list.

Furthermore, the updating method is initiated by a support system or other backend organization which targets the mobile device(s) that need a roaming list update. This advantageously reduces the effort which may otherwise be required on behalf of the user of the mobile device to i) check that the roaming list(s) downloaded in the mobile device is/are up to date, and ii) actually update the list(s) if such list(s) do need an update. Additionally, the automatic updating of the roaming list(s) ensures that the mobile device almost always has the most current version of the roaming list(s) stored therein. By having the most current version of the roaming list(s), the device is able to roam without incurring possible additional charges and/or costs.

Examples of the method disclosed herein will be described hereinbelow in conjunction with FIGS. 1 and 2. It is to be understood that these examples may be used to update any mobile device including, but not limited to, cellular phones, personal digital assistants, smartphones, laptop computers, vehicle dedicated communication devices (e.g., telematics units), and/or the like. For purposes of illustration, the examples of the method will be described hereinbelow using a vehicle dedicated communications device as the mobile device. As will be described in further detail below in conjunction with FIG. 1, the telematics unit (identified by reference numeral 14) is operatively disposed in a mobile vehicle (identified by reference numeral 12). In the examples discussed herein, the device is in communication with a telematics call center. It is to be understood, however, that the mobile device may otherwise be in communication with another back-end system and/or business logic that is/are not necessarily a telematics call center.

As used herein, the term "user" includes owners and/or operators of the mobile device. In instances where the mobile device is a telematics unit, the term "user" also refers to vehicle owners, operators, passengers and/or other persons capable of operating the telematics unit inside the vehicle. It is to be further understood that the term "user" may be used interchangeably with subscriber/service subscriber.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

It is to be further understood that "communication" is to be construed to include all forms of communication, including direct and indirect communication. As such, indirect communication may include communication between two components with additional component(s) located therebetween.

Furthermore, a "roaming list" refers to a list of information residing in the mobile device, where such information includes at least the frequency bands that the mobile device can use to establish a phone connection in various geographic areas. The list is often ordered by the bands that the mobile device should try first when attempting to make a connection. In other words, the roaming list is a priority list of phone towers located in various geographic areas that the mobile device can use to establish a phone connection. Also, the term "roaming list" may be used interchangeably with the term preferred roaming list (PRL).

Referring now to FIG. 1, in an example, the system 10 includes the vehicle 12, the telematics unit 14, the wireless carrier/communication system 16 (including, but not limited to, one or more cell towers 18, one or more base stations and/or mobile switching centers (MSCs) 20, and one or more service providers (not shown)), one or more land networks 22, and one or more back-end systems, which, in this example is a call center 24. In an example, the wireless carrier/communication system 16 is a two-way radio frequency communication system. The wireless carrier/communication system 16 may, for example, be used to establish communication between the call center 24 and the telematics unit 14.

In another example, the wireless carrier/communication system 16 includes one or more servers 92 operatively connected to a remotely accessible page 94 (e.g., a webpage). In an example, the remotely accessible page 94 is accessible by a vehicle owner, as well as by the call center 24. The remotely accessible page 94 is also directly linked to the call center 24, whereby information uploaded to the page 94 may be retrieved, at the time of uploading or shortly thereafter, by the call center 24.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines executing within processing device 36.

It is to be understood that the telematics unit 14 may be implemented without one or more of the above listed components, such as, for example, the wireless modem 42. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The electronic memory 38 may be used to store any information pertaining to, for example, the telematics unit 14 (e.g., a mobile dialing number (MDN), user settings/preferences, etc.), various vehicle systems and/or components (e.g., odometer readings, vehicle settings, etc.), address books (e.g., phone numbers, addresses, etc.), computer programs and/or routines configured to run the electronic processor 36, and/or the like. In an example, the electronic memory 38 is also configured to store one or more roaming lists or preferred roaming lists (PRL) therein.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services, some of which may not be listed herein, and is configured to fulfill one or more user or subscriber requests. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications generally utilize radio transmissions to establish a voice channel with wireless carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

Microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58.

The vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain the vehicle data for use by the telematics unit 14 or the call center 24 to determine the operation of the vehicle 12. Non-limiting example sensor interface modules 66 include powertrain control, climate control, body control, and/or the like.

In a non-limiting example, the vehicle hardware 26 includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

Wireless carrier/communication system 16 may be a cellular telephone system or any other suitable wireless system that transmits signals between the vehicle hardware 26 and land network 22. According to an example, wireless carrier/communication system 16 includes one or more cell towers 18, base stations and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 20 and a cell tower 18 may be co-located at the same site or they could be remotely located, and a single base station 20 may be coupled to various cell towers 18 or various base stations 20 could be coupled with a single MSC 20. A speech codec or vocoder may also be incorporated in one or more of the base stations 20, but depending on the particular architecture of the wireless network 16, it could be incorporated within a Mobile Switching Center 20 or some other network components as well.

Land network 22 may be a conventional land-based telecommunications network that is connected to one or more landline telephones and connects wireless carrier/communication network 16 to call center 24. For example, land network 22 may include a public switched telephone network (PSTN) and/or an Internet protocol (IP) network. It is to be understood that one or more segments of the land network 22 may be implemented in the form of a standard wired network, a fiber of other optical network, a cable network, other wireless networks such as wireless local networks (WLANs) or networks providing broadband wireless access (BWA), or any combination thereof.

Call center 24 (as mentioned herein, one non-limiting example of a back-end system), which is in selective and operative communication with the telematics unit 14 via the wireless communication system 16, is designed to provide the vehicle hardware 26 with a number of different system back-end functions. For instance, the call center 24 may be used to obtain updated roaming lists, and then to transmit such lists to the telematics unit 14 when needed. In an example, the transmission of the roaming lists may be accomplished, for example, using circuit-switched data (CSD) transfer via one or more modems (e.g., modem 42 in the telematics unit 14 and modem 96 at the call center 24), routers, and/or other data equipment suitable for transmission control protocol (TCP), IP, and/or packet data transfer.

According to the example shown in FIG. 1, the call center 24 generally includes one or more switches 68, servers 70, databases 72, live and/or automated advisors 62, 62', a processor 84, as well as a variety of other telecommunication and computer equipment 74 that is known to those skilled in the art. These various call center components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs configured to accomplish a variety of call center 24 functions. In an example, the processor 84 may include a roaming list update application 90 having at least one computer program enabling the processor 84 to perform various steps of the examples of the method disclosed herein. For instance, the roaming list update application 90 may include computer-readable code for recognizing a roaming list update trigger initiated by an event and computer-readable code for identifying the mobile device (e.g., the telematics unit 14) as requiring a roaming list update based on the recognizing of the trigger. Further details of the method steps performed by the computer-readable code of the roaming list update application 90 will be further described below at least in conjunction with FIG. 2.

The live advisor 62 may be physically present at the call center 24 or may be located remote from the call center 24 while communicating therethrough. Although the illustrated example has been described as it would be used in conjunction with a manned call center 24, it is to be appreciated that the call center 24 may be any central or remote facility, manned or unmanned, mobile or fixed, to or from which it is desirable to exchange voice and data communications.

Switch 68, which may be a private branch exchange (PBX) switch, routes incoming signals so that voice transmissions are usually sent to either the live advisor 62 or the automated response system 62', and data transmissions are passed on to the modem 96 or other piece of equipment (not shown) for demodulation and further signal processing. The modem 96 preferably includes an encoder, as previously explained, and can be connected to various devices such as the server 70 and database 72. For example, database 72 may be designed to store subscriber profile records, subscriber behavioral patterns, or any other pertinent subscriber information.

A cellular service provider generally owns and/or operates the wireless carrier/communication system 16. It is to be understood that, although the cellular service provider (not shown) may be located at the call center 24, the call center 24 is a separate and distinct entity from the cellular service provider. In an example, the cellular service provider is located remote from the call center 24. A cellular service provider provides the user with telephone and/or Internet services, while the call center 24 is a telematics service provider. The cellular service provider is generally a wireless carrier (such as, for example, Verizon Wireless®, AT&T®, Sprint®, etc.). It is to be understood that the cellular service provider may interact with the call center 24 to provide various service(s) to the user.

Examples of the method of updating a roaming list in a mobile device (e.g., the telematics unit 14) will now be described in conjunction with FIG. 2. Such examples will be described with the assumption that the mobile device (e.g., the telematics unit 14) is an activated device (i.e., a device that has stored therein an active mobile dialing number that enables the device to place and receive calls).

Figure 2:
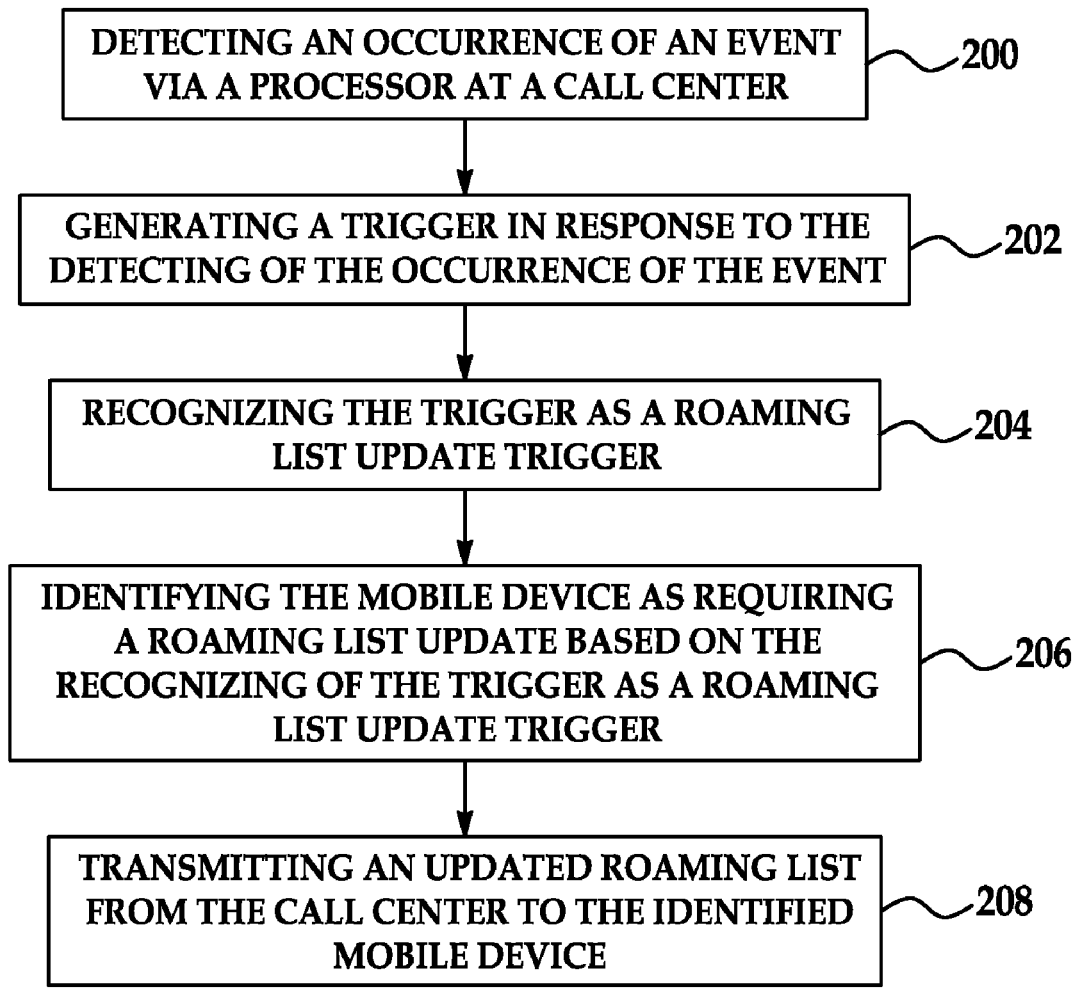
FIG. 2 is flow diagram depicting an example of a method for updating a roaming list in a mobile device.

As shown in FIG. 2, the method includes detecting an occurrence of an event by the processor 84 at a back-end system (such as the call center 24) (as shown by reference numeral 200). As used herein, the term "event" refers to a predefined happening initiated by a subscriber's action and/or by the back-end system in response to a subscriber's action that, upon the detecting of the occurrence thereof, causes the processor 84 at the call center 24 to generate a trigger. As will be described in further detail below, the processor 84 will determine whether the trigger qualifies as a roaming list update trigger and, upon recognizing the same, a roaming list update application 90 operated by the processor 84 may be initiated. The roaming list update application 90 may then be used to select an updated roaming list for the telematics unit 14. Such updates are generated by the cellular service provider, which defines various geographic network boundaries. In a non-limiting example, the geographic network boundaries may be defined by the market area. In another non-limiting example, the boundaries may be defined by previously established cellular network systems, cellular markets, and/or cellular service layouts. Whenever updates are made (which are often unique for each cellular service provider), the updates are supplied to the call center 24 so that the individual telematics units 14 associated with the call center 24 may retrieve appropriate updates. After the telematics unit 14 has been identified by the processor 84, the applicable updated roaming list for that telematics unit 14 is selected from the list at the call center 24 via the roaming list update application 90.

Whether the trigger qualifies as a roaming list update trigger depends, at least in part, on the significance of the event detected. In other words, the roaming list update trigger is associated with an action that is significant enough to render a roaming list then-currently stored in the telematics unit 14 of the detected vehicle 10 to be out of date. Such roaming list update triggers include, but are not limited to, changes in a subscriber's account or account profile, a connectivity issue, and a history of persistent roaming of the telematics unit 14. On the other hand, acts that do not render the then-currently stored roaming list out of date are not considered to be "roaming list update triggers" as used herein. An example of an act that does not constitute a roaming list update trigger includes instances where the telematics unit 14 simply roams (e.g., on a single occasion) outside of the geographic area(s) covered by its then-currently stored roaming list. Such an act, in and of itself, is not considered to be significant enough to trigger a roaming list update function at the call center 24.

The detecting of the occurrence of the event includes realizing or becoming aware, by the processor 84 at the call center 24, of the fact that an event has actually occurred. As soon as the event is detected, the roaming list update application 90 at the call center 24 is then triggered by the processor 84. Thereafter, the method further includes generating, by the processor 84 at the call center 24 (e.g., via the roaming list update application 90), a trigger in response to detecting of the event (as shown by reference numeral 202 in FIG. 2).

It is to be understood that any act that could potentially trigger a roaming list update will be evaluated by the processor 84 to determine if such act (or event) qualifies as an actual roaming list update trigger. If the event does qualify, then the method further includes recognizing, by the processor 84 at the call center 24, that the occurrence of the event is a roaming list update trigger (as shown by reference numeral 204 in FIG. 2). Examples of the detecting of the event, the determining if the event qualifies as a roaming list update trigger, and the recognizing of the event as a roaming list update trigger will now be described in further detail in view of the following examples. It is to be understood, however, that the following examples are considered to be non-limiting, and that other examples are within the purview of this disclosure.

In one example, a connectivity issue may exist between the call center 24 and the telematics unit 14. For instance, the telematics unit 14 may request a service from the call center 24, such as, e.g., a vehicle door unlock. Such request may be accomplished, for example, by submitting a voice call to the call center 24 using a cellular phone. In response to the request, the call center 24 attempts to fulfill the request but is unable to because of a failed connection with the telematics unit 14. In other words, the call center 24 is unable to transmit the door unlock service to the telematics unit 14 because the call center 24 cannot establish a wireless connection with the telematics unit 14. Assuming that the telematics unit 14 is functioning properly, the failed connection between the call center 24 and the telematics unit may be due, at least in part, to the telematics unit 14 using an improper wireless network. This improper wireless network may have been found, for example, by the telematics unit 14 using a non-preferred roaming number included in the roaming list that is then-currently stored in the telematics unit 14. Upon detecting the connectivity issue and generating the trigger, the processor 84 then determines whether the connectivity issue falls within the realm of events associated with a roaming list update trigger. If so, the roaming list update trigger would be recognized by the processor 84.

In another example, the subscriber may make one or more changes to his/her account profile (such as, e.g., a change in a garage address and/or a billing address of the subscriber) and/or one or more changes in his/her account (such as, e.g., the opening of a new subscriber account or the transfer of an old subscriber account to a new subscriber account). Such changes may result in the then-current roaming list (i.e., the then-current home wireless/cellular network) becoming inadequate, for example, because the vehicle 12 is persistently in a new location. As such, profile changes and/or additions may require that a different home cellular network be identified for the subscriber. Changes to the roaming list for a certain geographic area may be available and, thus, a roaming list update would be beneficial for the subscriber given the fact that the subscriber is living in a new location or has added an account associated with an address an a particular location. Such updates would redefine the roaming area and home wireless network for the particular user based upon his/her activities.

The changes to his/her account and/or profile may be made by the subscriber by uploading the change to the subscriber's account profile (such as in instances where changes to the account profile are made) or creating a new account profile (such as in instances where a change to a subscriber's account is made) using the remotely accessible page 94. The changes to the subscriber's account profile or the subscriber's account may otherwise be made by submitting a voice call to the call center 24.

Upon detecting that the subscriber's account or account profile has been changed and generating a trigger, the processor 84 then determines whether such changes fall within the realm of events associated with an actual roaming list update trigger. This determination may be accomplished by reviewing what changes were actually made and then determining if the changes would materially alter the roaming list(s) of the telematics unit 14. If, for example, the subscriber changes her name on her account profile from her maiden name to her married name, then the processor 84 may consider the change as having very little, if any, impact on the roaming list of the telematics unit 14. In this case, the processor 84 may not recognize the event (i.e., the change to the account profile) as a roaming list update trigger. If, on the other hand, the subscriber changes her garage address in her account profile, then the processor 84 may consider the change as having a large impact on the roaming list of the telematics unit 14 (e.g., if the new garage address is located in a different city than the old garage address). In this case, processor 84 may recognize the event (i.e., the change of the garage address of the subscriber in the account profile) as an actual roaming list update trigger.

In still another example, the telematics unit 14 may be identified, by the processor 84, as being a persistent roaming device based on a history of the roaming activity of the unit 14. In this example, a roaming entry (e.g., in the form of a network identifier value) is included in a history profile stored in a database 72 at the call center 24. When a network identifier value (NIV) is used, the NIV may be used to identify which network the telematics unit 14 was using when communicating with the call center 24. Identifying the network that the telematics unit 14 was using enables the call center 24, via the processor 84, to determine whether or not the telematics unit 14 was roaming. If the telematics unit 14 is roaming, the roaming entry may include, e.g., the date and time of the roaming, as well as the location of the vehicle 12 during roaming. If, for instance, the processor 84 determines that the telematics unit 14 roams continuously (e.g., if from month-to-month, the telematics unit 14 is consistently on a roaming network), then the device is considered to be a "persistent roaming device". On the other hand, if the processor 84 determines that the telematics unit 14 has roamed in an isolated fashion (e.g., once or twice in a month), for example, such lone acts of roaming may be considered, by the processor 84, as insufficient to be considered a roaming list update trigger.

In the foregoing example, when the processor 84 detects that the telematics unit 14 is roaming, the processor 84 generates a trigger. Then the processor 84 determines whether or not the roaming activity of the telematics unit 14 is an isolated incident or is part of a pattern of roaming activity based on the history profile. If the processor 84 determines that the telematics unit 14 is a persistent roaming device, then the trigger is recognized, by the processor 84, as a roaming list update trigger.

Once the processor 84 at the call center 24 has recognized the trigger as a roaming list update trigger, the method further includes identifying the telematics unit 14 as requiring a roaming list update (as shown by reference numeral 206). Such identification is made via the processor 84 using the roaming list update application 90. In an example, identifying that the telematics unit 14 requires a roaming list update may be accomplished in real time. For example, as soon as an event is detected by the processor 84 and a roaming list update trigger is recognized, the telematics unit 14 is immediately identified, by the roaming list update application 90, as requiring a roaming list update. Identifying that the telematics unit 14 requires a roaming list update may otherwise be accomplished periodically. Such periodic identification may be more efficient, for example, with regard to system resources, time, and economic factors/concerns, during off-peak hours. For example, the detected events may be stored in one of the databases 72 in a subscriber's profile, and then the telematics unit 14 may be identified as needing an update when a batch query is performed on the database 72. Such batch query may be performed daily, weekly, or at any other prescribed time interval.

After the telematics unit 14 has been identified by the processor 84, an applicable updated roaming list for the telematics unit 14 is selected via the roaming list update application 90. In a non-limiting example, the applicable updated roaming list is selected based on the garage address of the user. As mentioned herein, updates to the roaming lists may be available from the cellular service provider, which defines various geographic network boundaries and sends such updates to the call center 24. Once selected, the updated roaming list is transmitted, via a wireless connection using the wireless communication system 16, from the call center 24 to the telematics unit 14 (as shown at reference numeral 208 in FIG. 2). In an example, the transmitting of the updated roaming list is accomplished automatically as soon as the telematics unit 14 is identified as requiring a roaming list update. The transmitted updated roaming list is then stored in the electronic memory 38 operatively associated with the telematics unit 14.

This updated roaming list now stored in the telematics unit 14 may then be used by the telematics unit 14 until another update is required or available. When this occurs, the method disclosed herein may be repeated to obtain yet another updated roaming list.

While several examples have been described in detail, it will be apparent to those skilled in the art that the disclosed examples may be modified. Therefore, the foregoing description is to be considered exemplary rather than limiting.

The invention claimed is:

1. A method of updating a roaming list in a mobile device, comprising:
   targeting the mobile device as one requiring a roaming list update, the targeting being accomplished by:
      detecting an occurrence of an event, the detecting being accomplished via a processor at a back-end system in selective and operative communication with the mobile device;
      generating, by the processor, a trigger in response to the detecting of the occurrence of the event;
      recognizing, by the processor, the trigger as a roaming list update trigger, the recognizing being accomplished upon determining that the event from which the trigger is generated renders the roaming list then-currently stored in the mobile device as being out of date; and
      identifying, via the processor, the mobile device as requiring the roaming list update based on the recognizing of the event as the roaming list update trigger;
   by the processor at the back-end system running a roaming list update application, selecting the roaming list update for the identified mobile device, the roaming list update application including computer readable code, embedded on a tangible, non-transitory computer readable medium, for performing the selecting; and
   transmitting, via a wireless connection, the roaming list update from the back-end system to the identified mobile device.

2. The method as defined in claim 1 wherein the recognizing of the trigger as the roaming list update trigger includes:
   requesting a service from the back-end system;
   attempting, by the back-end system, to fulfill the request; and
   failing to fulfill the request due to a failed connection with the mobile device.

3. The method as defined in claim 1 wherein the recognizing of the trigger as the roaming list update trigger includes changing at least one of a garage address or a billing address associated with a subscriber's account profile.

4. The method as defined in claim 1 wherein the recognizing of the trigger as the roaming list update trigger includes: i) opening a subscriber account; or ii) moving an old subscriber account to a new subscriber account.

5. The method as defined in claim 1 wherein the recognizing of the trigger as the roaming list update trigger includes identifying the mobile device as being a persistent roaming device based on a history of the mobile device, the history being stored in a history profile at the back-end system.

6. The method as defined in claim 1 wherein prior to the recognizing, the method further comprises determining that the trigger qualifies as the roaming list update trigger.

7. The method as defined in claim 1 wherein the identifying of the mobile device as requiring the roaming list update is accomplished in real time.

8. The method as defined in claim 1, further comprising storing the event in a database, and wherein the identifying of the mobile device as requiring the roaming list update is accomplished via a batch query on the database.

9. The method as defined in claim 1 wherein the mobile device is a telematics unit operatively disposed in a mobile vehicle, and wherein the back-end system is a call center.

10. The method as defined in claim 1 wherein the transmitting is accomplished automatically upon identifying the mobile device.

11. A method of updating a roaming list in a mobile device, comprising:
    targeting the mobile device as one requiring a roaming list update, the targeting being accomplished by:
       engaging in an event by the mobile device, the event being initiated by at least one of i) a subscriber-related action, or ii) a back-end system in response to the subscriber-related action;
       detecting the event by a processor operatively associated with the back-end system, wherein the back-end system is in operative and selective communication with the mobile device;
       triggering a roaming list update application operated by the processor at the back-end system upon the detecting of the occurrence of the event;
       generating, by the processor at the back-end system, a trigger in response to the event;
       recognizing, by the processor at the back-end system, that the trigger qualifies as a roaming list update trigger, the recognizing being accomplished upon determining that the event from which the trigger is generated renders the roaming list then-currently stored in the mobile device as being out of date; and
       identifying, by the roaming list update application, the mobile device as requiring the roaming list update;
    by the processor at the back-end system running a roaming list update application, selecting the roaming list update for the identified mobile device, the roaming list update application including computer readable code, embedded on a tangible, non-transitory computer readable medium, for performing the selecting; and
    transmitting, via a wireless connection, the roaming list update from the back-end system to the identified mobile device.

12. A roaming list updating system, comprising:
    a mobile device having stored therein a preferred roaming list; and
    a back-end system in selective and operative communication with the mobile device, the back-end system comprising:
       a processor including a roaming list update application for targeting the mobile device as one requiring a roaming list update, the application including computer readable code, embedded on a tangible, non-transitory computer readable medium, for:
          generating a trigger in response to detecting an event associated with the mobile device;
          recognizing the trigger as a roaming list update trigger upon determining that the event from which the trigger renders the preferred roaming list stored in the mobile device as being out of date;
          identifying the mobile device as requiring the roaming list update based on the recognizing of the trigger as the roaming list update trigger; and selecting the roaming list update for the identified mobile device; and wireless communication means for transmitting the roaming list update from the back-end system to the identified mobile device.

13. The roaming list updating system as defined in claim 12 wherein the roaming list update application further includes computer-readable code for determining that the trigger qualifies as the roaming list update trigger.

14. The roaming list updating system as defined in claim 12 wherein the roaming list update trigger is selected from i) a connectivity issue between the back-end system and the mobile device, ii) an identification of the mobile device as being a persistent roaming device, iii) a change in a subscriber's account profile, iv) a change in a subscriber's account, or v) combinations thereof.

15. The roaming list updating system as defined in claim 12 wherein the mobile device is a telematics unit operatively disposed in a mobile vehicle, and wherein the back-end system is a call center.

* * * * *